(12) United States Patent
Kanari et al.

(10) Patent No.: US 10,482,920 B2
(45) Date of Patent: Nov. 19, 2019

(54) DIGITAL CONTENT REPRODUCTION CONTROL SIGNAL, PHONOGRAPH RECORD RECORDING CONTROL SIGNAL, DIGITAL CONTENT REPRODUCTION SYSTEM, DIGITAL CONTENT REPRODUCTION CONTROL SYSTEM, DIGITAL CONTENT REPRODUCTION CONTROL DEVICE, DIGITAL CONTENT REPRODUCTION METHOD, AND DIGITAL CONTENT REPRODUCTION PROGRAM

(71) Applicant: Pioneer DJ CORPORATION, Yokohama-shi, Kanagawa (JP)

(72) Inventors: Kazutaka Kanari, Yokohama (JP); Michifumi Kojima, Yokohama (JP)

(73) Assignee: PIONEER DJ CORPORATION, Yokohama-Shi (JP)

( * ) Notice: Subject to any disclaimer, the term of this patent is extended or adjusted under 35 U.S.C. 154(b) by 0 days.

(21) Appl. No.: 15/763,295

(22) PCT Filed: Sep. 28, 2015

(86) PCT No.: PCT/JP2015/077315
§ 371 (c)(1),
(2) Date: Mar. 26, 2018

(87) PCT Pub. No.: WO2017/056153
PCT Pub. Date: Apr. 6, 2017

(65) Prior Publication Data
US 2018/0204592 A1 Jul. 19, 2018

(51) Int. Cl.
*G11B 20/16* (2006.01)
*G11B 20/10* (2006.01)
(Continued)

(52) U.S. Cl.
CPC ............... *G11B 20/16* (2013.01); *G10H 1/02* (2013.01); *G10L 25/09* (2013.01); *G11B 3/008* (2013.01);
(Continued)

(58) Field of Classification Search
CPC ............... G10H 1/0091; G10H 1/0033; G10H 2210/155; G10H 1/00; G10H 1/0066; G10H 2210/385
(Continued)

(56) References Cited

U.S. PATENT DOCUMENTS 5,652,531 A * 7/1997 Co ..................... H03L 7/089
327/12
2002/0191727 A1* 12/2002 Staszewski .......... H03C 3/0966
375/376
(Continued)

FOREIGN PATENT DOCUMENTS

EP        2466585 A1    6/2012
JP     2003-525510      8/2003
(Continued)

OTHER PUBLICATIONS

International Search Report, dated Dec. 15, 2015 (Dec. 15, 2015), 2 pages.
(Continued)

*Primary Examiner* — Alexander Krzystan
(74) *Attorney, Agent, or Firm* — Rankin, Hill & Clark LLP

(57) ABSTRACT

A digital content reproduction control signal for controlling a reproduction of digital content includes: a first control signal (SG1) having a time code signal recorded therein and having a predetermined frequency; and a second control signal (SG2) having a 2n-fold frequency of the frequency of the first control signal, n representing a natural number, in
(Continued)

which the first control signal (SG1) and the second control signal (SG2) are combined such that zero-cross points of a waveform of the first control signal (SG1) are aligned with zero-cross points of a waveform of the second control signal (SG2) on a time axis.

5 Claims, 9 Drawing Sheets

(51) Int. Cl.
  *G10H 1/02*   (2006.01)
  *G10L 25/09*   (2013.01)
  *G11B 27/30*   (2006.01)
  *G11B 27/00*   (2006.01)
  *G11B 3/00*   (2006.01)

(52) U.S. Cl.
  CPC ........ *G11B 20/10* (2013.01); *G11B 20/10527* (2013.01); *G11B 27/005* (2013.01); *G11B 27/3036* (2013.01); *G10H 2210/241* (2013.01)

(58) Field of Classification Search
  USPC .......................................... 381/118, 61, 119
  See application file for complete search history.

(56) References Cited

U.S. PATENT DOCUMENTS

| | | | |
|---|---|---|---|
| 2005/0163001 A1* | 7/2005 | Otalora ................ | G10H 1/0091 369/47.15 |
| 2006/0130639 A1* | 6/2006 | Bastian ................ | G10H 1/0091 84/612 |
| 2012/0158162 A1* | 6/2012 | Hertz ................ | G11B 20/10037 700/94 |
| 2014/0160908 A1* | 6/2014 | Hino ...................... | G11B 20/12 369/30.03 |
| 2018/0204592 A1* | 7/2018 | Kanari .................. | G11B 20/10 |

FOREIGN PATENT DOCUMENTS

| | | |
|---|---|---|
| JP | 2014-149892 | 8/2014 |
| WO | 95/34071 | 12/1995 |

OTHER PUBLICATIONS

English translation of International Preliminary Report on Patentability dated Apr. 3, 2018 (Apr. 3, 2018), Application No. PCT/JP2015/077315, 6 pages.
European Search Report dated May 13, 2019, 7 pages.

\* cited by examiner

DIGITAL CONTENT REPRODUCTION CONTROL SIGNAL, PHONOGRAPH RECORD RECORDING CONTROL SIGNAL, DIGITAL CONTENT REPRODUCTION SYSTEM, DIGITAL CONTENT REPRODUCTION CONTROL SYSTEM, DIGITAL CONTENT REPRODUCTION CONTROL DEVICE, DIGITAL CONTENT REPRODUCTION METHOD, AND DIGITAL CONTENT REPRODUCTION PROGRAM

TECHNICAL FIELD

The present invention relates to a digital content reproduction control signal, a record disc on which the control signal is recorded, a digital content reproduction system, a digital content reproduction control system, a digital content reproduction controller, a digital content reproduction method, and a digital content reproduction program.

BACKGROUND ART

A DVS (Digital Vinyl System) has been known as a technology of reproducing digital content.

The DVS includes: a dedicated record disc on which a time code signal is recorded; a signal reproduction device such as a record player and a CD player; an analog-digital convertor such as an audio interface; a computer; and a reproduction output device such as a mixer and a speaker.

The dedicated record disc on which time codes (time information) are recorded is reproduced on the record player. The reproduced time code signal is converted from analog to digital by an audio interface and then outputted to the computer.

The computer extracts audio signals from music piece data being reproduced, adds acoustic effects set on the computer to the extracted audio signals, and outputs the audio signals corresponding to the transmitted time codes to the audio interface.

The audio interface outputs the audio signals inputted from the computer. The mixer outputs the audio signals to a reproduction output device such as a power amplifier and a speaker.

In such a DVS, a performer provides a scratch operation and a pitchbend operation on the record player, so that a time code signal is reproduced according to these operations. Consequently, audio signals according to the operation of the performer can be reproduced and outputted. Moreover, since various acoustic effects can be added to the audio signals in the computer, a DJ performance can make an extremely high dramatic impact.

The invention of Patent Literature 1 discloses a record disc dedicated for use in a DVS, in which right and left time code signals reproducible by a pickup and having the same frequency are recorded in such a condition that phases of the signals are relatively shifted.

In the invention of Patent Literature 1, with use of the shifted-phase right and left time code signals, a reproduction direction in which the record disc is being rotated in a forward direction or in a reverse direction is judged by detecting zero-cross points of one of the right and left time code signals, at which the time code signal is converted from a negative value to a positive value, and by detecting whether a polarity of the other of the right and left time code signals is negative or positive at the detected zero-cross points.

CITATION LIST

Patent Literature(s)

Patent Literature 1: JP2003-525510A

SUMMARY OF THE INVENTION

Problem(s) to be Solved by the Invention

Since the right and left time code signals have the same frequency in the invention of Patent Literature 1, when a performer manipulates a turn table at a high speed, an interval between zero-cross points detected for a predetermined sampling period may be shortened to make it difficult to detect the zero-cross points since the zero-cross points are restricted by frequency characteristics of the signal reproduction device.

To the contrary, when the frequency of the time code signals is set low in advance and the performer manipulates the turn table at a low speed, it takes time to detect the zero-cross points, thereby increasing a processing time.

An object of the invention is to provide a digital content reproduction control signal processible in a reduced time and having zero-cross points clearly detectable when a performer manipulates a turn table at a high speed and a low speed, a record on which the digital content reproduction control signal are recorded, a digital content reproduction system, a digital content reproduction control system, a digital content reproduction controller, a digital content reproduction method, and a digital content reproduction program.

Means for Solving the Problem(s)

According to an aspect of the invention, a digital content reproduction control signal for controlling a reproduction of digital content, the signal includes: a first control signal including a time code signal recorded therein and having a predetermined frequency; and a second control signal having a 2n-fold frequency of the frequency of the first control signal, n representing a natural number, in which the first control signal and the second control signal are combined such that zero-cross points of a waveform of the first control signal are aligned with zero-cross points of a waveform of the second control signal on a time axis.

According to another aspect of the invention, a record disc includes the digital content reproduction control signal according to the above aspect of the invention which is recorded therein.

According to still another aspect of the invention, a digital content reproduction system includes: a record disc in which a digital content reproduction control signal is recorded, the digital content reproduction control signal including: a first control signal including a time code recorded therein and having a predetermined frequency; and a second control signal having a 2n-fold frequency of the frequency of the first control signal, n representing a natural number, in which the first control signal and the second control signal are combined such that zero-cross points of a waveform of the first control signal are aligned with zero-cross points of a waveform of the second control signal on a time axis; a signal reproduction device configured to reproduce the digital content reproduction control signal recorded in the record disc; and a reproduction processor configured to reproduce digital content based on the reproduced digital content reproduction control signal, the reproduction processor including: a reproduction direction judging unit configured to detect a polarity of the second control signal based on a detection of the zero-cross points of the first control signal, and judge a reproduction direction of the record disc; a reproduction speed judging unit configured to detect the zero-cross points of one of the first control signal and the second control signal and judge a reproduction speed of the record disc; a reproduction position judging unit configured to decode the time code recorded in the first control signal and judge a reproduction position of the record disc; a reproduction controlling unit configured to control a reproduction of the digital content based on the judgement results of the reproduction direction judging unit, the reproduction speed judging unit and the reproduction position judging unit; and a reproduction processing unit configured to be controlled by the reproduction controlling unit to reproduce the digital content.

According to a further aspect of the invention, a digital content reproduction control system includes: a record disc in which a digital content reproduction control signal is recorded, the digital content reproduction control signal including: a first control signal including a time code recorded therein and having a predetermined frequency; and a second control signal having a 2n-fold frequency of the frequency of the first control signal, n representing a natural number, in which the first control signal and the second control signal are combined such that zero-cross points of a waveform of the first control signal are aligned with zero-cross points of a waveform of the second control signal on a time axis; a signal reproduction device configured to reproduce the digital content reproduction control signal recorded in the record disc; and a reproduction controller configured to control a reproduction processor for digital content based on the digital content reproduction control signal inputted from the signal reproduction device, the reproduction controller including: a reproduction direction judging unit configured to detect a polarity of the second control signal based on a detection of the zero-cross points of the first control signal, and judge a reproduction direction of the record disc; and a reproduction controlling unit configured to output a reproduction control signal of the digital content to the reproduction processor based on the judgement result of the reproduction direction judging unit.

According to a still further aspect of the invention, a digital content reproduction controller includes: a digital content reproduction controller configured to receive a digital content reproduction control signal, the digital content reproduction control signal including: a first control signal including a time code recorded therein and having a predetermined frequency; and a second control signal having a 2n-fold frequency of the frequency of the first control signal, n representing a natural number, in which the first control signal and the second control signal are combined such that zero-cross points of a waveform of the first control signal are aligned with zero-cross points of a waveform of the second control signal on a time axis, the digital content reproduction controller including: a reproduction controlling unit configured to control a reproduction processing unit based on the received digital content reproduction control signal.

According to a still further aspect of the invention, a digital content reproduction method includes: inputting a digital content reproduction control signal including: a first control signal including a time code recorded therein and having a predetermined frequency; and a second control signal having a 2n-fold frequency of the frequency of the first control signal, n representing a natural number, in which the first control signal and the second control signal are combined such that zero-cross points of a waveform of the first control signal are aligned with zero-cross points of a waveform of the second control signal on a time axis; judging a reproduction direction of digital content based on the inputted digital content reproduction control signal; and reproducing the digital content based on the judged reproduction direction.

According to a still further aspect of the invention, a digital content reproduction program to be run on a computer includes: inputting a digital content reproduction control signal including: a first control signal including a time code recorded therein and having a predetermined frequency; and a second control signal having a 2n-fold frequency of the frequency of the first control signal, n representing a natural number, in which the first control signal and the second control signal are combined such that zero-cross points of a waveform of the first control signal are aligned with zero-cross points of a waveform of the second control signal on a time axis; judging a reproduction direction of digital content based on the inputted digital content reproduction control signal; and reproducing the digital content based on the judged reproduction direction.

BRIEF DESCRIPTION OF DRAWING(S)

DESCRIPTION OF EMBODIMENT(S)

[1] Overall Configuration of System

Figure 1:
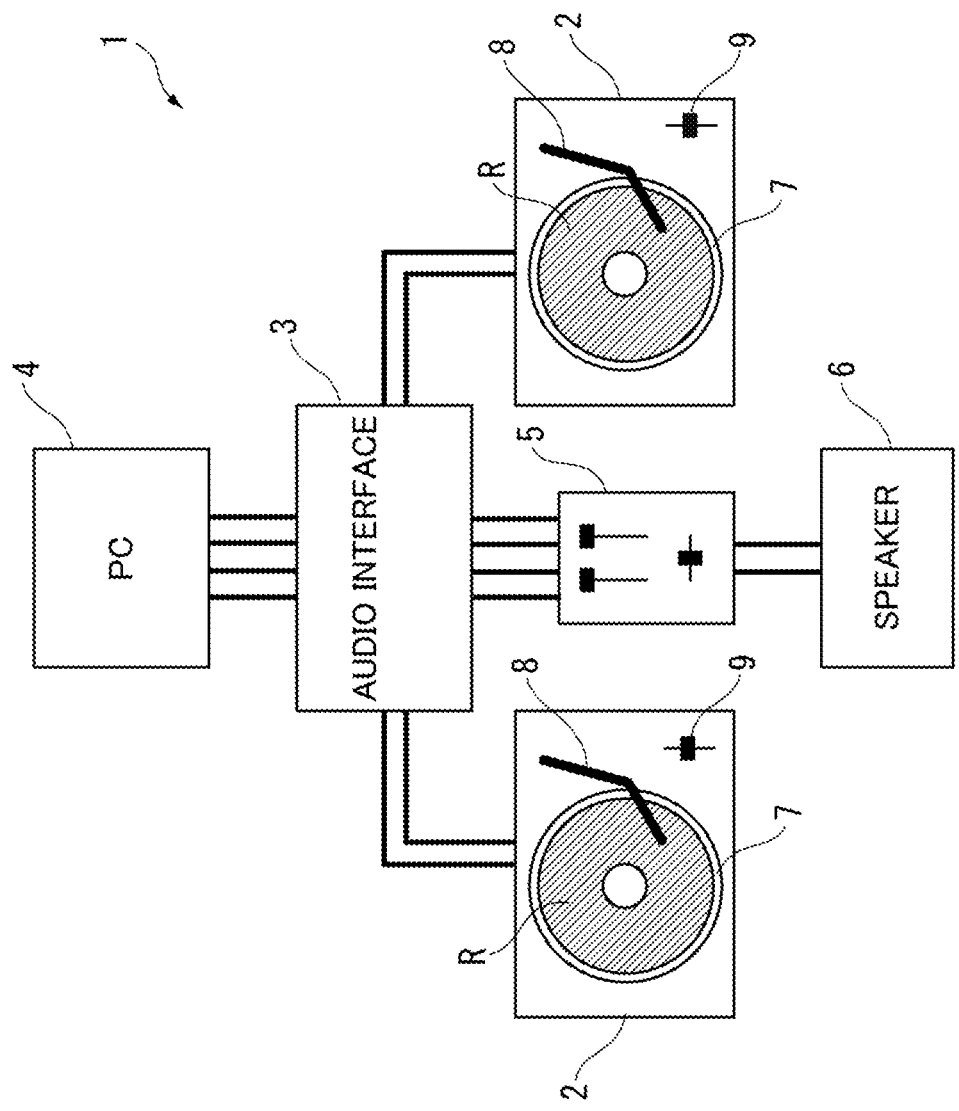
FIG. 1 is a schematic illustration showing a configuration of an audio reproduction system according to an exemplary embodiment of the invention.

FIG. 1 shows an audio reproduction system 1 that is a digital content reproduction system according to an exemplary embodiment of the invention. The audio reproduction system 1 includes: a signal reproduction device exemplified by two record players 2; an audio interface 3; a reproduction processor exemplified by a computer 4; a mixer 5; and a speaker 6.

Each of the record players 2 includes: a turn table 7 on which an analog record disc R is placed; a tone arm 8 supporting a needle for reproducing an audio signal recorded in the record disc R; and a pitch controller 9 configured to adjust a rotation speed of the turn table 7. The needle provided to a distal end of the tone arm 8 moves along a groove of the record disc R to output the time code signal recorded in the groove in a form of two-channel (right and left) analog audio signals.

A performer can rotate the record disc R in a reverse direction and/or at a low speed and a high speed by scratching the turn table 7 and/or operating the pitch controller 9.

When receiving the two-channel analog signals (time code signals) outputted from the record players 2, the audio interface 3 converts the analog signals to digital signals and outputs the digital signals to a USB interface and the like of the computer 4.

When receiving the digital audio signals from the computer 4 via the USB interface and the like, the audio interface 3 converts the digital audio signals to analog signals and outputs the analog signals to the mixer 5 in a form of two-channel analog signals.

The mixer 5 subjects the inputted analog signals to an audio processing (e.g., a mixing processing of two music piece data by operating the two record players 2) depending on operations of various operational elements installed in the mixer 5. Subsequently, the mixer 5 outputs the processed audio signals to the speaker 6.

The computer 4 has typical computer components such as a display, a keyboard, a mouse, and a hard disc drive, in which a DJ application software for achieving the DVS is stored in the hard disc drive.

Moreover, the computer 4 decodes the digital time code signals inputted from the audio interface 3 to retrieve the time codes and outputs to the audio interface 3 audio signals of the music piece data being reproduced corresponding to the time codes. It should be noted that the music piece data may be stored in the computer 4 or in an external device or external server capable of communicating with the computer 4. In the exemplary embodiment, the music piece data is described as being stored in the computer 4. Although the two record players 2 are provided in the exemplary embodiment, the following description will be made in relation to one record player 2 for convenience.

[2] Time Code Signal Recorded in Record Disc R

Figure 2:
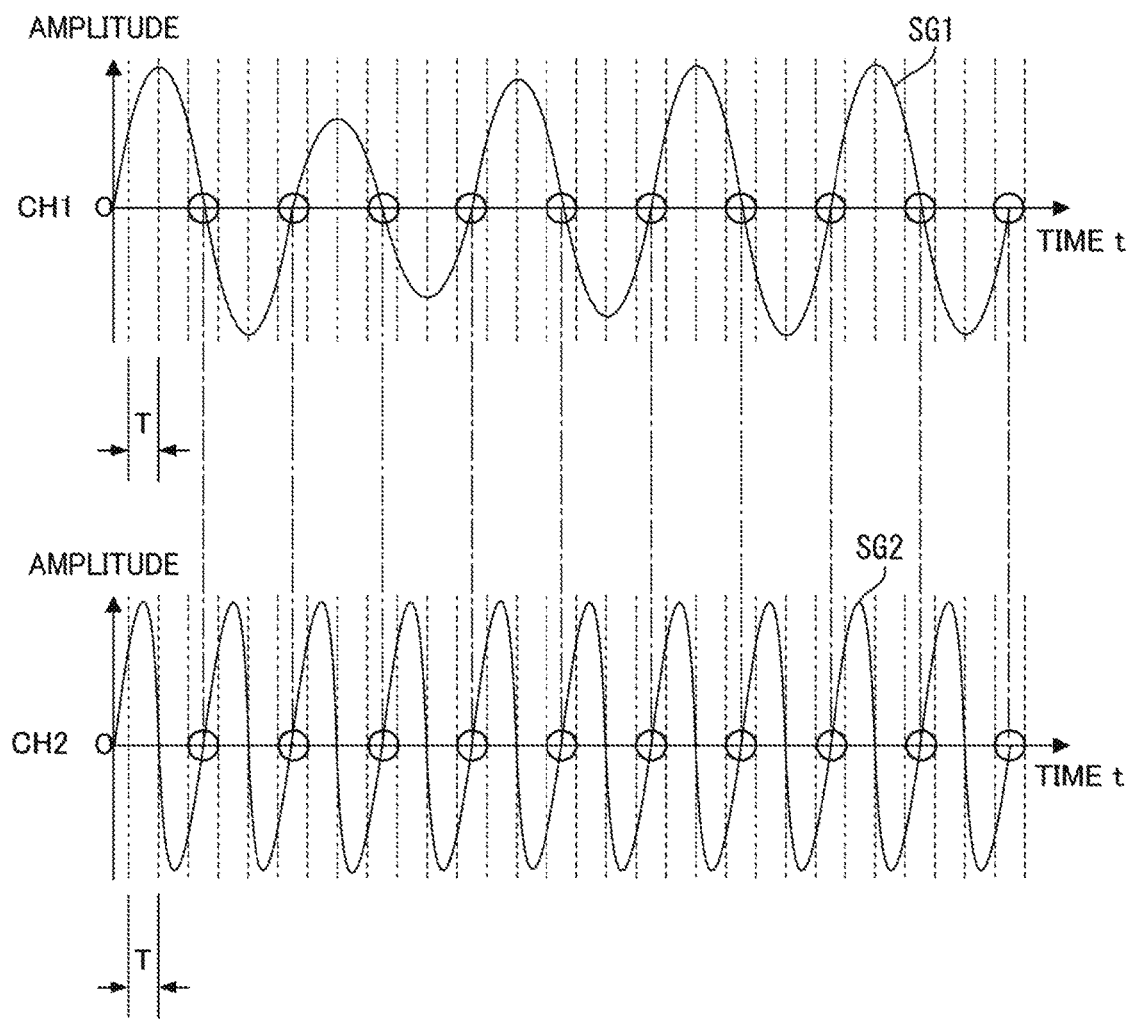
FIG. 2 is a schematic illustration showing time code signals recorded on a record disc in the exemplary embodiment.

As shown in FIG. 2, time code signals are recorded in two channels CH1 and CH2 of the record disc R. The time code signals are a combination of a first control signal SG1 recorded in the channel CH1 with a second control signal SG2 recorded in the channel CH2.

The first control signal SG1, which is a signal having a variable amplitude, records a time code in a predetermined bit string with use of a variation in the amplitude. A plurality of time codes are recorded on the record groove (track) extending from an outer circumference toward an inner circumference of the record disc R at positions corresponding to reproduction positions.

The second control signal SG2 has a frequency twice as high as that of the first control signal SG1. As shown by a circle (o) in FIG. 2, the first control signal SG1 and the second control signal SG2 are combined such that zero-cross points of the first control signal SG1 are aligned with zero-cross points of the second control signal SG2 on a time axis.

Although the frequency of the second control signal SG2 is defined to be twice the frequency of the first control signal SG1 in the exemplary embodiment, a signal having a 2n-fold (n is a natural number) frequency than the frequency of the first control signal SG1 is usable as the second control signal.

The first control signal SG1 and the second control signal SG2 recorded in the record disc R are outputted in a form of analog signals from the record player 2 to the audio interface 3.

The audio interface 3 subjects the inputted analog first control signal SG1 and second control signal SG2 to a digital processing in a sampling cycle T and outputs the digital first control signal SG1 and second control signal SG2 to the computer 4.

A sampling frequency, which is a reciprocal number of the sampling cycle T for the digital processing, can be, for instance, 44.1 kHz usable for CD and the like. Accordingly, an upper limit of the frequency of each of the first control signal SG1 and the second control signal SG2 is determined to be 22.05 kHz that is a half of the sampling frequency.

[3] Functional Configuration of Computer 4

Figure 3:
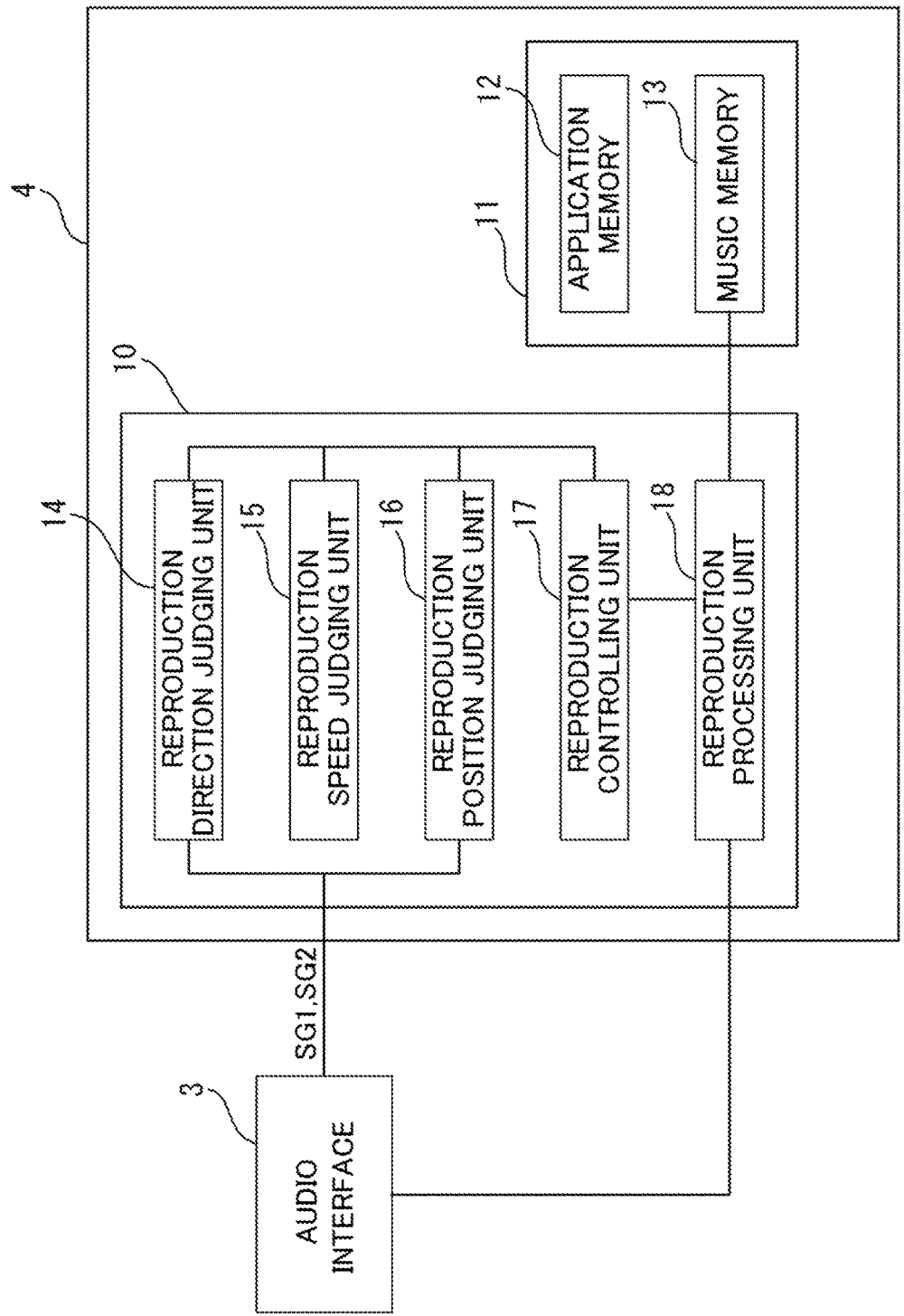
FIG. 3 is a functional block diagram showing a configuration of a computer in the exemplary embodiment.

FIG. 3 shows a function block diagram of the computer 4.

The computer 4, which includes a CPU (Central Processing Unit) 10 and a hard disc 11, is configured to reproduce a music piece based on the outputted time code signals from the audio interface 3 and depending on the operation made to the record player 2 by a performer.

The hard disc 11 includes: an application memory 12 storing the DJ application software for achieving the DVS; and a music memory 13 storing a music piece in a form of digital content to be reproduced by the DJ application software.

The music piece stored in the music memory 13 is in a form of digitalized data in the same manner as above in the audio interface 3. The digitalized data is recorded as a plurality of digital data obtained by discretizing analog data.

The CPU 10 includes a reproduction direction judging unit 14, a reproduction speed judging unit 15, a reproduction position judging unit 16, a reproduction controlling unit 17, and a reproduction processing unit 18, which are to be run in response to the execution of the DJ application software stored in the application memory 12.

The reproduction direction judging unit 14 judges a reproduction direction (a rotational direction) of the record disc R based on the first control signal SG1 and the second control signal SG2 of the inputted time code signals.

Figure 4:
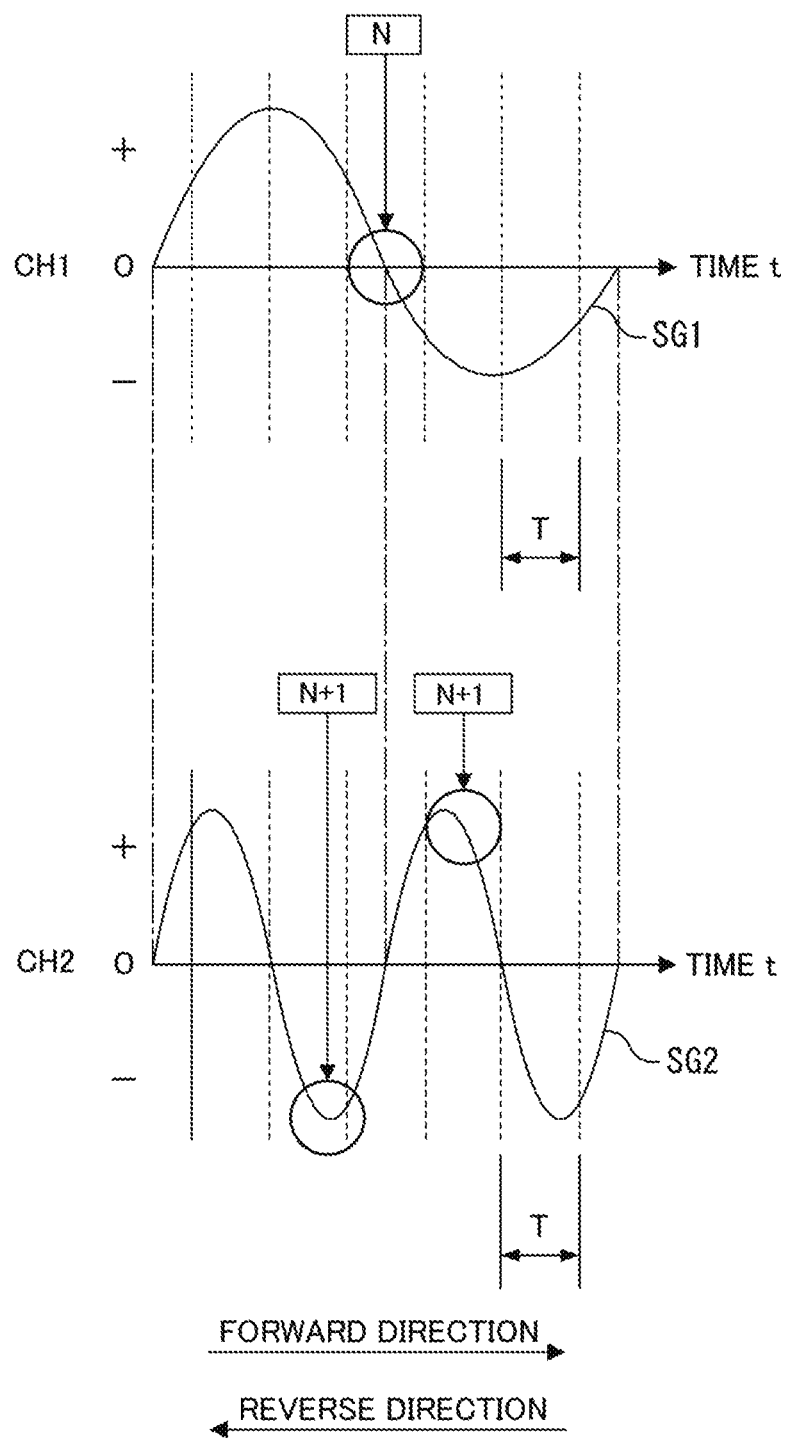
FIG. 4 is a schematic illustration showing a judging method of a reproduction direction in the exemplary embodiment.

Specifically, as shown in FIG. 4, the reproduction direction judging unit 14 detects a timing of an Nth sampling including a zero-cross point of the first control signal SG1.

Next, the reproduction direction judging unit 14 detects polarity of the second control signal SG2 at a timing of an (N+1)th sampling. When the polarity of the second control signal SG2 is positive, the reproduction direction judging unit 14 judges that the reproduction direction is a forward direction.

To the contrary, when the polarity of the second control signal SG2 at the timing of the (N+1)th sampling is negative, the reproduction direction judging unit 14 judges that the reproduction direction is a reverse direction.

The reproduction direction judging unit 14 outputs the judgement result to the reproduction controlling unit 17.

The reproduction speed judging unit 15 judges a reproduction speed of the record disc R based on the first control signal SG1 and the second control signal SG2.

Figure 5:
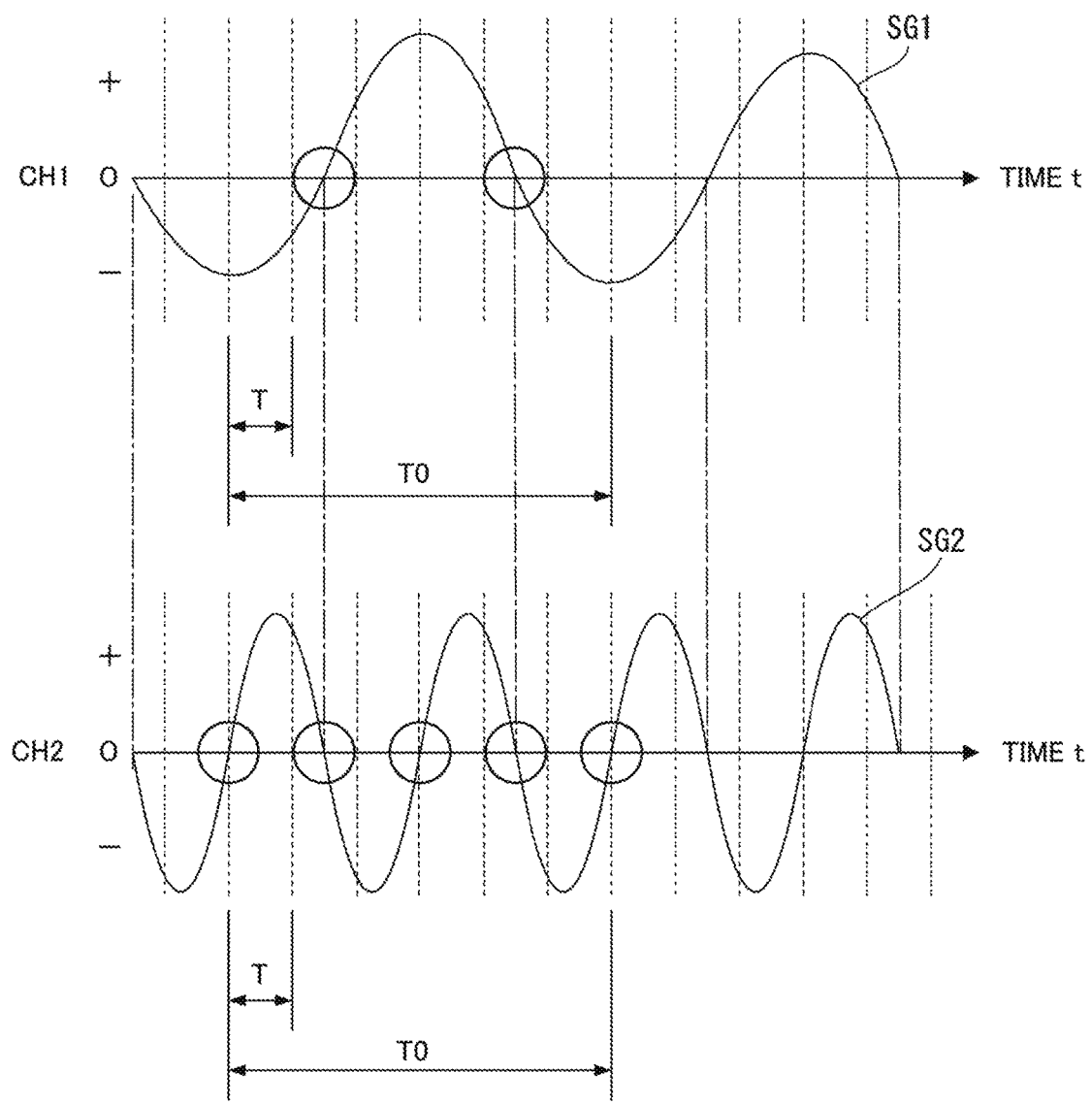
FIG. 5 is a schematic illustration showing a judging method of a reproduction speed in the exemplary embodiment.

Specifically, as shown in FIG. 5, since the sampling cycle T for the digital processing is fixed, the reproduction speed judging unit 15 judges the reproduction speed of the record disc R by counting the number of the zero-cross points indicated by a circle (○) for a predetermined period T0 in the first control signal SG1 or the second control signal SG2 in FIG. 5.

The reproduction speed judging unit 15 outputs the judgement result to the reproduction controlling unit 17.

When the performer manipulates the tone arm 8 of the record player 2 to shift the reproduction position from one to another destination, the reproduction position judging unit 16 judges the reproduction position at the destination on the record disc R.

Figure 6:
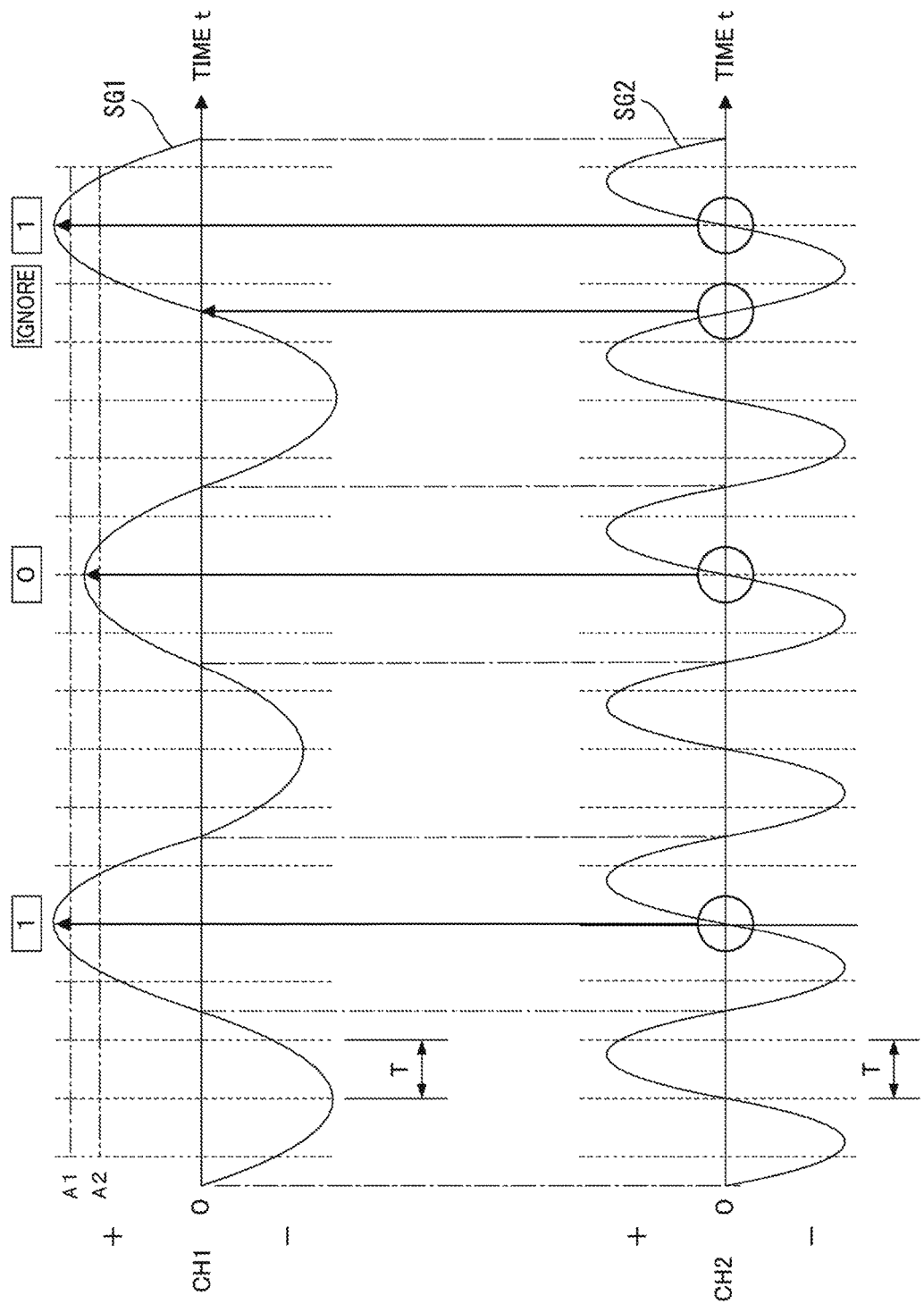
FIG. 6 is a schematic illustration showing a judging method of a reproduction position in the exemplary embodiment.

Specifically, as shown in FIG. 6, the reproduction position judging unit 16 detects a signal intensity of the first control signal SG1 when detecting the zero-cross points of the second control signal SG2. The reproduction position judging unit 16 has a first judging reference value A1 and a second judging reference value A2 in order to decode magnitude of the signal intensity of the first control signal SG1 to a time code.

When the detected signal intensity exceeds the first judging reference value A1, the reproduction position judging unit 16 decodes the first control signal SG1 to a code "1." When the detected signal intensity falls below the first judging reference value A1, the reproduction position judging unit 16 decodes the first control signal SG1 to a code "0." The reproduction position judging unit 16 repeats the decoding for predetermined times to acquire the time code of a predetermined bit string.

Moreover, when the signal intensity detected in the first control signal SG1 is less than the second judging reference value A2 at the zero-cross points in the second control signal SG2, the reproduction position judging unit 16 ignores the signal intensity detected in the first control signal SG1 not to decode the first control signal SG1.

In the exemplary embodiment, since a bit string generated by LFSR (Linear Feedback Shift Register) is used as the bit string used for the time code, the reproduction position judging unit 16 can uniquely acquire the time code by the decoding based on the rotational direction (reproduction direction) of the record disc R.

The reproduction position judging unit 16 outputs the acquired time code to the reproduction controlling unit 17.

Referring back to FIG. 3, the reproduction controlling unit 17 outputs a control signal to the reproduction processing unit 18 based on the reproduction direction judged by the reproduction direction judging unit 14, the reproduction speed judged by the reproduction speed judging unit 15, and the time code acquired by the reproduction position judging unit 16.

The reproduction processing unit 18 reproduces a music piece stored in the music memory 13 of the hard disc 11 based on the control signal inputted from the reproduction controlling unit 17.

Specifically, the reproduction processing unit 18 retrieves digital data corresponding to the time code contained in the control signal and reproduces the digital data based on the reproduction direction and the reproduction speed contained in the control signal.

At this time, the reproduction processing unit 18 adds acoustic effects (e.g., echo and reverb), which are set on the DJ application software run on the computer 4, to the reproduced music piece and outputs the obtained music piece to the audio interface 3.

[4] Music Piece Reproduction by Audio Reproduction System 1

Figure 7:
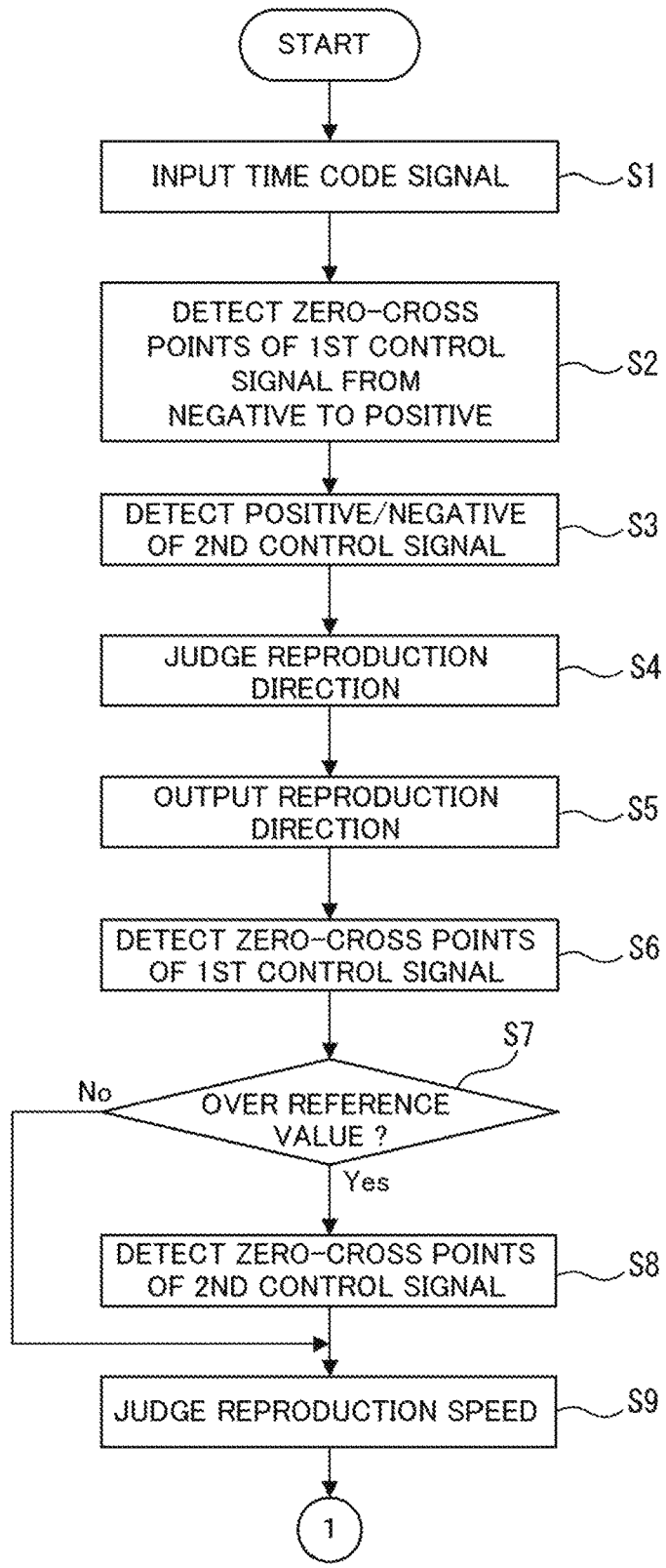
FIG. 7 is a flow chart for explaining an audio reproduction method by an audio reproduction system in the exemplary embodiment.
Figure 8:
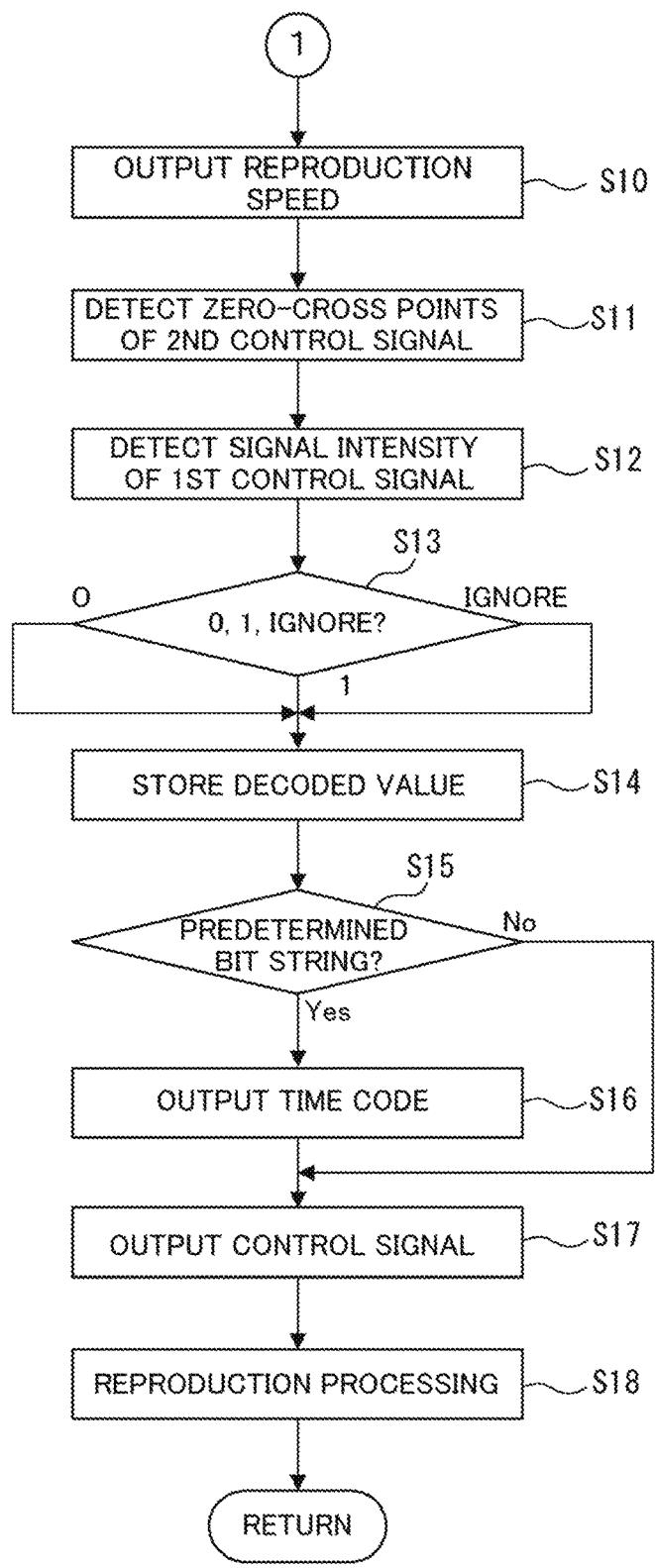
FIG. 8 is another flow chart for explaining the audio reproduction method by the audio reproduction system in the exemplary embodiment.

Next, the above-described music piece reproduction by the audio reproduction system 1 will be described with reference to flowcharts shown in FIGS. 7 and 8.

The time code signal subjected to the digital processing by the audio interface 3 is inputted to the reproduction direction judging unit 14, the reproduction speed judging unit 15, and the reproduction position judging unit 16 (Step S1).

The reproduction direction judging unit 14 detects a timing of the Nth sampling including a zero-cross point of the first control signal SG1 (Step S2). Next, the reproduction direction judging unit 14 detects polarity of the second control signal SG2 at a timing of an (N+1)th sampling (Step S3).

The reproduction direction judging unit 14 judges whether the record disc R rotates in a forward direction or a reverse direction (Step S4).

The reproduction direction judging unit 14 outputs the rotational direction of the record disc R to the reproduction position judging unit 16 and the reproduction controlling unit 17 (Step S5).

The reproduction speed judging unit 15 detects zero-cross points of the first control signal SG1 (Step S6).

The reproduction speed judging unit 15 judges whether an interval for detecting zero-cross points of the first control signal SG1 exceeds a reference value (Step S7).

When the interval for detecting the zero-cross points of the first control signal SG1 exceeds the reference value, the reproduction speed judging unit 15 switches the detection of the zero-cross points of the first control signal SG1 to detection of zero-cross points of the second control signal SG2 (Step S8). When the interval for detecting the zero-cross points of the first control signal SG1 is equal to or less than the reference value, the reproduction speed judging unit 15 keeps detecting the zero-cross points of the first control signal SG1.

The reproduction speed judging unit 15 counts the number of times of the detection of the zero-cross points for the period T0 and judges the reproduction speed represented by the counted number/period T0 (Step S9).

The reproduction speed judging unit 15 outputs the judged reproduction speed to the reproduction controlling unit 17 (Step S10).

The reproduction position judging unit 16 detects the zero-cross points of the second control signal SG2 (Step S11).

Next, the reproduction position judging unit 16 detects the signal intensity of the first control signal SG1 when detecting the zero-cross points of the second control signal SG2 (Step S12), and compares the detected signal intensity with the first judging reference value A1 and the second judging reference value A2 to judge whether to decode the first control signal SG1 (Step S13).

When the detected signal intensity is equal to or more than the first judging reference value A1, the reproduction position judging unit 16 decodes the first control signal SG1 to the code "1." When the detected signal intensity is less than the first judging reference value A1, the reproduction position judging unit 16 decodes the first control signal SG1 to the code "0." When the detected signal intensity is less than the second judging reference value A2, the reproduction position judging unit 16 ignores the detected signal intensity. The reproduction position judging unit 16 sequentially stores, in a memory, code values obtained by the decoding (Step S14).

The reproduction position judging unit 16 judges whether a string of the code values stored in the memory has a predetermined bit number (Step S15).

When judging that the string of the code values stored in the memory has the predetermined bit number, the reproduction position judging unit 16 outputs the string of the code values to the reproduction controlling unit 17 as a time code (Step S16).

At this time, since the bit string generated by LFSR is used, the reproduction position judging unit 16 uniquely acquires the time code by the decoding based on the reproduction direction inputted from the reproduction direction judging unit 14 and outputs the obtained time code to the reproduction controlling unit 17.

The reproduction controlling unit 17 outputs a control signal to the reproduction processing unit 18 based on the reproduction direction judged by the reproduction direction judging unit 14 and the reproduction speed judged by the reproduction speed judging unit 15. After the reproduction position judging unit 16 outputs the time code, the reproduction controlling unit 17 outputs the control signal including the time code (Step S17).

Based on the control signal inputted from the reproduction controlling unit 17, the reproduction processing unit 18 reproduces a music piece applied with acoustic effects set on the DJ application software and stored in the music memory 13 (Step S18).

The music piece reproduced by the reproduction processing unit 18 is outputted in a form of a digital signal to the audio interface 3. After the digital signal is converted into an analog signal by the audio interface 3, the analog signal is outputted to the mixer 5 to be outputted from the speaker 6.

Subsequently, this operation is repeated to reproduce the music piece in the audio reproduction system 1.

[5] Advantages of Embodiment(s)

The time code signals recorded in the two channels CH1, CH2 of the record disc disclosed in Patent Literature 1 and described in the background art have the same frequency. Thus, an upper limit of the frequency capable of decoding the digitalized signals (having the sampling frequency of 44.1 kHz) by the audio interface 3 to analog signals is 22.05 Hz.

Accordingly, when the frequency of the time code signal is defined at 1 kHz, up to a 22-fold rotation speed of the record disc R can be detected. However, when the frequency of the time code signal is defined at 2 kHz, an 11-fold (half a 22-fold) rotation speed of the record disc R becomes an upper limit.

On the other hand, when the reproduction speed is defined as $\frac{1}{100}$ of a typical rotation speed, an interval of the zero-cross points is 25 ms at 2 kHz of the frequency of the time code signal. However, at 1 kHz of the frequency of the time code signal, the interval of the zero-cross points becomes 50 ms, thereby increasing the processing time.

In the exemplary embodiment, since the frequency of the second control signal SG2 of the record disc R is twice as high as that of the first control signal SG1, the zero-cross points of the first control signal SG1 are detected at the rotation speed of the record disc R being equal to or more than a predetermined reference value, so that the zero-cross points can be clearly detected even at a high speed rotation of the record disc R.

When the rotation speed of the record disc R falls below the reference value, the interval for detecting the zero-cross points can be shortened by detecting the zero-cross points of the second control signal SG2, thereby avoiding increase in the processing time for the reproduction speed judging unit 15 to judge the reproduction speed.

Consequently, according to the exemplary embodiment, the zero-cross points can be clearly detected when a performer manipulates the turn table 7 at high or low speed, and the processing time by the reproduction speed judging unit 15 can be shortened.

[6] Modification(s) of Embodiment(s)

The invention is by no means limited to the above exemplary embodiment, but includes modification(s) as described below.

In the above exemplary embodiment, the zero-cross points at an angle of zero degrees in the first control signal SG1 are aligned with the zero-cross points at an angle of zero degrees in the second control signal SG2 as shown in FIG. 2. However, the invention is not limited to the above matching of the zero-cross points of the first control signal SG1 and the second control signal SG2.

The zero-cross points at the angle of zero degrees in the first control signal SG1 may be aligned with the zero-cross points at the angle of 180 degrees in the second control signal SG2. Alternatively, the zero-cross points at the angle of 180 degrees in the first control signal SG1 may be aligned with the zero-cross points at the angle of zero degrees in the second control signal SG2.

Further, as long as the timing of the sampling for detecting the first control signal SG1 is not deviated from the timing of the sampling for detecting the zero-cross points of the second control signal SG2, the zero-cross points of the first control signal SG1 may be deviated from the zero-cross points of the second control signal SG2.

In the above exemplary embodiment, the time code signal has a sinusoidal waveform. However, the invention is not limited to the sinusoidal waveform.

Figure 9A:
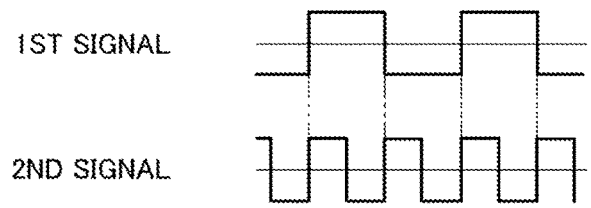
FIG. 9A is a schematic illustration showing a waveform of a digital content reproduction control signal according to a modification of the exemplary embodiment.
Figure 9B:
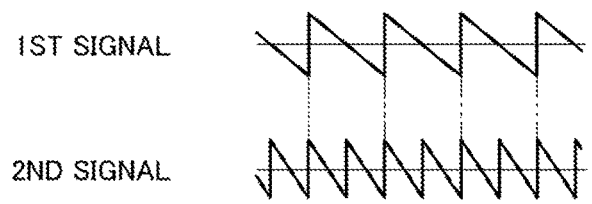
FIG. 9B is a schematic illustration showing a waveform of a digital content reproduction control signal according to another modification of the exemplary embodiment.
Figure 9C:
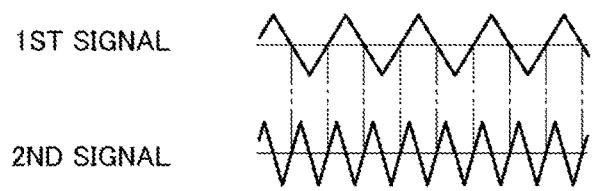
FIG. 9C is a schematic illustration showing a waveform of a digital content reproduction control signal according to still another modification of the exemplary embodiment.

For instance, as shown in FIGS. 9A to 9C, the time code signal may have a rectangular waveform, a sawtooth waveform, or a triangular waveform.

Moreover, in the above exemplary embodiment, the waveform of the first control signal SG1 and the waveform of the second control signal SG2 are substantially similar to each other with the only difference in the frequency. However, the invention is not limited to this waveform.

For instance, the waveform of the first control signal may be the rectangular waveform as shown in FIG. 9A and the waveform of the second control signal may be the sawtooth waveform as shown in FIG. 9B.

Figure 9D:
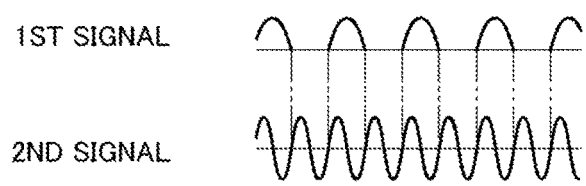
FIG. 9D is a schematic illustration showing a waveform of a digital content reproduction control signal according to a further modification of the exemplary embodiment.
Figure 9E:
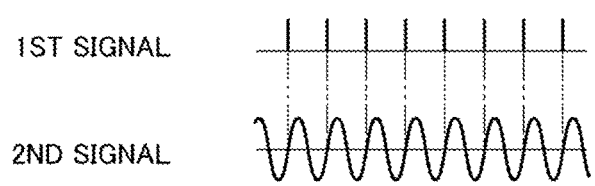
FIG. 9E is a schematic illustration showing a waveform of a digital content reproduction control signal according to a still further modification of the exemplary embodiment.

In the above exemplary embodiment, the first control signal SG1 and the second control signal SG2 have a continuous waveform. However, the first control signal may have a discrete waveforms as shown in FIGS. 9D and 9E.

Figure 9F:
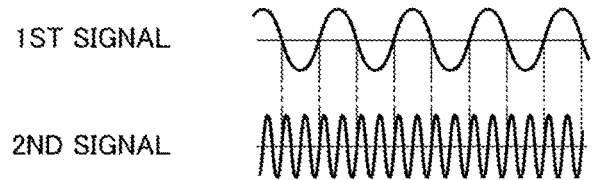
FIG. 9F is a schematic illustration showing a waveform of a digital content reproduction control signal according to a still further modification of the exemplary embodiment.

In the above exemplary embodiment, the frequency of the second control signal SG2 is twice as high as the frequency of the first control signal SG1. However, as shown in FIG. 9F, the frequency of the second control signal may be four times as high as the frequency of the first control signal SG1, or alternatively, the second control signal may have a 2n-fold frequency than the first control signal SG1.

With this arrangement, even when the reproduction speed of the dedicated record disc R is slower than that in the above exemplary embodiment, the reproduction speed of the audio contents can be controlled within the same processing time as in the above exemplary embodiment.

In the time code signals shown in FIGS. 9A to 9E, the frequency of the second control signal SG2 may be a 2×n-fold (e.g., four-fold and six-fold) frequency of the first control signal SG1.

In the above exemplary embodiment, the first control signal SG1 is recorded in the channel CH1 and the second control signal SG2 is recoded in the channel CH2 to provide the time code signals. However, the invention is not limited to the two channels for the time code signals.

For instance, the first control signal SG1 and the second control signal SG2 may be superimposed in a single channel to provide a time code signal.

Due to the difference in the frequency between the first control signal SG1 and the second control signal SG2, the first control signal SG1 can be extracted through a low-pass filter from the superimposed time code signal while the second control signal SG2 can be extracted through a high-pass filter from the superimposed time code signal.

Since the rotation speed of the record disc in the above-described DVS is variable, it is only required to use one of the first control signal SG1 and the second control signal SG2, which has a larger signal intensity than the other of the first control signal SG1 and the second control signal SG2, as a pilot signal and adjust a cut-off frequency of the high-pass filter and the low-pass filter based on the detection cycle of the pilot signal.

In the above exemplary embodiment, the analog record player 2 is used as the signal reproduction device. However, the invention is not limited to the analog record player.

For instance, a control signal for reproducing digital content may be recorded in an optical disc (e.g., CD) and a CD player may be used as the signal reproduction device. Alternatively, the control signal for reproducing digital content may be recorded in a form of an electronic file in a flash memory and may be reproduced using an electronic file player soft program by a computer and the like.

In the above exemplary embodiment, the control signal for reproducing the digital content is used for reproducing the music piece data. However, the control signal may be used for reproducing a video signal of a video and the like after the video signal is subjected to the digital processing.

In the above exemplary embodiment, the record disc R is manipulated with the record player 2 to generate the time code signal. However, the invention is not limited to such a generation of the time code signal. For instance, an analog or a digital signal generator may generate a digital content reproduction control signal and control a reproduction of the digital content based on the generated digital content reproduction control signal.

In the above exemplary embodiment, the reproduction processing unit 18 is arranged within the computer 4. However, the invention is not limited to this arrangement. Only the reproduction processing unit may be provided as a separate body.

In the above exemplary embodiment, the reproduction direction, the reproduction speed, and the reproduction position of the record disc R are judged at the zero-cross points of the first control signal SG1 and the second control signal SG2. However, the invention is not limited to the zero-cross points as the judgement reference. For instance, when the first control signal SG1 and the second control signal SG2 are voltage signals, zero volt may be used as the judgement reference. When a predetermined bias voltage is applied to the voltage signals, a bias voltage that is a median of the amplitude may be used as a judgement reference value.

Alternatively, a signal intensity that is a half value of the amplitude may be used as the judgement reference.

In the above exemplary embodiment, the signal intensity of the first control signal SG1 is judged at the positive polarity of the first control signal SG1 to be "0," "1" or "to be ignored." However, the invention is not limited to the above judgement at the positive polarity of the first control signal SG1.

For instance, the signal intensity of the first control signal SG1 may be judged at the negative polarity of the first control signal SG1. Alternatively, the signal intensity of the first control signal SG1 may be judged at the positive polarity of the first control signal SG1 to be one of "0" and "1" while at the negative polarity of the first control signal SG1 to be the other of "0" and "1."

In the above exemplary embodiment, the signal intensity of the first control signal SG1 is judged based on the first judging reference value A1 to be "0" or "1" and based on the second judging reference value A2 to be "0" or "to be ignored." However, the invention is not limited to the above judgement of the signal intensity. For instance, the second judging reference value A2 may be used for judging the signal intensity of the first control signal SG1 to be "0" or other code(s). In other words, the signal intensity of the first control signal SG1 may be judged with three or more values.

In the above exemplary embodiment, the time code signal, or a temporal signal, is used for judging the reproduction position. However, the invention is not limited to the time code signal. Any signal capable of expressing the reproduction position is usable. For instance, a signal such as a counter code to be incremented or decremented over time may be used, in which the counter code may be converted into a random code or pseudorandom code.

All suitable modifications and equivalents may be resorted to, falling within the scope of the invention.

The invention claimed is:

1. A record disc comprising a digital content reproduction control signal recorded therein, the signal comprising:
    a first control signal comprising a time code signal recorded therein and comprising a predetermined frequency; and
    a second control signal comprising a 2n-fold frequency of the frequency of the first control signal, n representing a natural number, wherein
    the first control signal and the second control signal are combined such that zero-cross points of a waveform of the first control signal are aligned with zero-cross points of a waveform of the second control signal on a time axis; and,
    a reproduction direction of the record disc is indicated by a polarity of the second control signal at a timing of a sampling of the waveform of the second control signal subsequent to a timing of a sampling of each of the zero-cross points of the waveform of the first control signal.

2. A digital content reproduction system, comprising:
    a record disc in which a digital content reproduction control signal is recorded, the digital content reproduction control signal comprising: a first control signal comprising a time code recorded therein and comprising a predetermined frequency; and a second control signal comprising a 2n-fold frequency of the frequency of the first control signal, n representing a natural number, wherein the first control signal and the second control signal are combined such that zero-cross points of a waveform of the first control signal are aligned with zero-cross points of a waveform of the second control signal on a time axis and a reproduction direction of the record disc is indicated by a polarity of the second control signal at a timing of a sampling of the waveform of the second control signal subsequent to a timing of a sampling of each of the zero-cross points of the waveform of the first control signal;

a signal reproduction device configured to reproduce the digital content reproduction control signal recorded in the record disc; and a reproduction processor configured to reproduce digital content based on the reproduced digital content reproduction control signal, the reproduction processor comprising:

a reproduction direction judging unit configured to detect the polarity of the second control signal based on a detection of the zero-cross points of the first control signal, and judge the reproduction direction of the record disc;

a reproduction controlling unit configured to control a reproduction of the digital content based on the judgement result of the reproduction direction judging unit; and a reproduction processing unit configured to be controlled by the reproduction controlling unit to reproduce the digital content.

3. A digital content reproduction control system, comprising:

a record disc in which a digital content reproduction control signal is recorded, the digital content reproduction control signal comprising: a first control signal comprising a time code recorded therein and comprising a predetermined frequency; and a second control signal comprising a 2n-fold frequency of the frequency of the first control signal, n representing a natural number, wherein the first control signal and the second control signal are combined such that zero-cross points of a waveform of the first control signal are aligned with zero-cross points of a waveform of the second control signal on a time axis and, a reproduction direction of the record disc is indicated by a polarity of the second control signal at a timing of a sampling of the waveform of the second control signal subsequent to a timing of a sampling of each of the zero-cross points of the waveform of the first control signal;

a signal reproduction device configured to reproduce the digital content reproduction control signal recorded in the record disc; and a reproduction controller configured to control a reproduction processor for digital content based on the digital content reproduction control signal inputted from the signal reproduction device, the reproduction controller comprising:

a reproduction direction judging unit configured to detect the polarity of the second control signal based on a detection of the zero-cross points of the first control signal, and judge the reproduction direction of the record disc; and a reproduction controlling unit configured to output a reproduction control signal of the digital content to the reproduction processor based on the judgement result of the reproduction direction judging unit.

4. A digital content reproduction method, comprising:

inputting a digital content reproduction control signal comprising: a first control signal comprising a time code recorded therein and comprising a predetermined frequency; and a second control signal comprising a 2n-fold frequency of the frequency of the first control signal, n representing a natural number, wherein the first control signal and the second control signal are combined such that zero-cross points of a waveform of the first control signal are aligned with zero-cross points of a waveform of the second control signal on a time axis and, a reproduction direction of the digital content is indicated by a polarity of the second control signal at a timing of a sampling of the waveform of the second control signal subsequent to a timing of a sampling of each of the zero-cross points of the waveform of the first control signal;

judging the reproduction direction of digital content based on the inputted digital content reproduction control signal; and reproducing the digital content or controlling a reproduction of the digital content based on the judged reproduction direction.

5. A digital content reproduction control system that is operable to control a computer, said control system comprising a record disc on which a program is recorded, said control system being configured to:

input a digital content reproduction control signal comprising: a first control signal comprising a time code recorded therein and comprising a predetermined frequency; and a second control signal comprising a 2n-fold frequency of the frequency of the first control signal, n representing a natural number, wherein the first control signal and the second control signal are combined such that zero-cross points of a waveform of the first control signal are aligned with zero-cross points of a waveform of the second control signal on a time axis and a reproduction direction of the digital content is indicated by a polarity of the second control signal at a timing of a sampling of the waveform of the second control signal subsequent to a timing of a sampling of each of the zero-cross points of the waveform of the first control signal;

judge the reproduction direction of digital content based on the inputted digital content reproduction control signal; and reproduce the digital content or control a reproduction of the digital content based on the judged reproduction direction.

* * * * *